United States Patent [19]
Groh

[11] Patent Number: 4,821,857
[45] Date of Patent: Apr. 18, 1989

[54] STAMPED ROLLER CLUTCH CAGE WITH INTEGRAL SNAP RING

[75] Inventor: David M. Groh, Hanover Park, Ill.

[73] Assignee: Borg-Warner Transmission and Engine Components Corporation, Ithaca, N.Y.

[21] Appl. No.: 220,276

[22] Filed: Jul. 18, 1988

[51] Int. Cl.[4] ............................................. F16D 41/07
[52] U.S. Cl. .................................. 192/45; 192/41 R; 188/82.84
[58] Field of Search .................... 192/41 R, 41 A, 44, 192/45, 45.1; 188/82.84

[56] References Cited

U.S. PATENT DOCUMENTS

| | | | |
|---|---|---|---|
| 2,969,266 | 1/1961 | Schaeffler | 384/564 |
| 3,927,744 | 12/1975 | Hallerberg | 192/45 |

FOREIGN PATENT DOCUMENTS

| | | | |
|---|---|---|---|
| 1087119 | 10/1980 | Canada . | |
| 2348733 | 4/1975 | Fed. Rep. of Germany | 192/45 |

OTHER PUBLICATIONS

U.S. patent application Ser. No. 87,061, "Roller Cage for Overrunning Clutches"–Filed Aug. 19, 1987.

Primary Examiner—Rodney H. Bonck
Assistant Examiner—David A. Testardi
Attorney, Agent, or Firm—Robert L. Zieg; James J. Jennings; James A. Geppert

[57] ABSTRACT

A one-piece metal cage for a roller clutch formed from a flat stamping to provide a flat annular side plate and a side ring having a wavy form spaced from the side plate by a plurality of crossbars extending parallel to the axis of the cage. The crests of the wavy side ring extend farther outward radially than the side plate to snap into an annular groove in the outer race to positively retain the cage between the races.

7 Claims, 2 Drawing Sheets

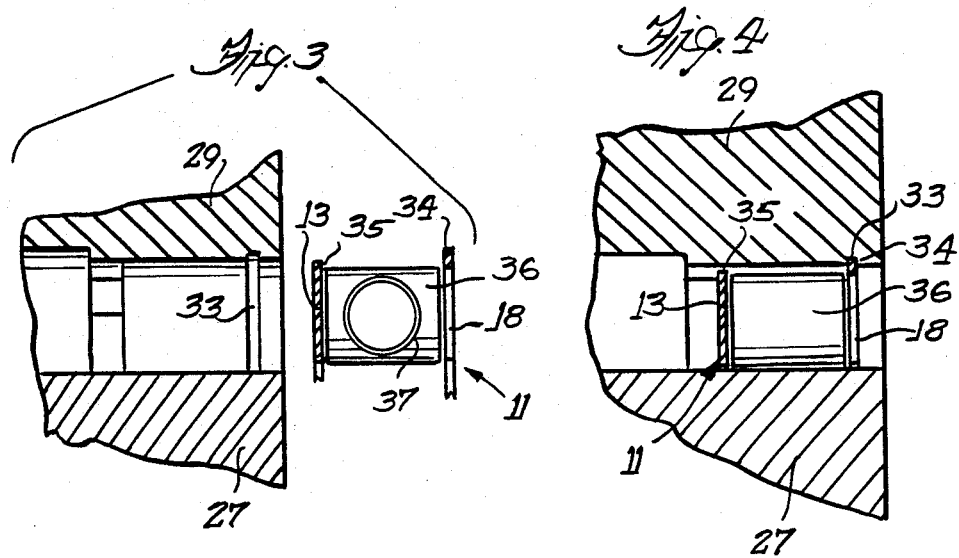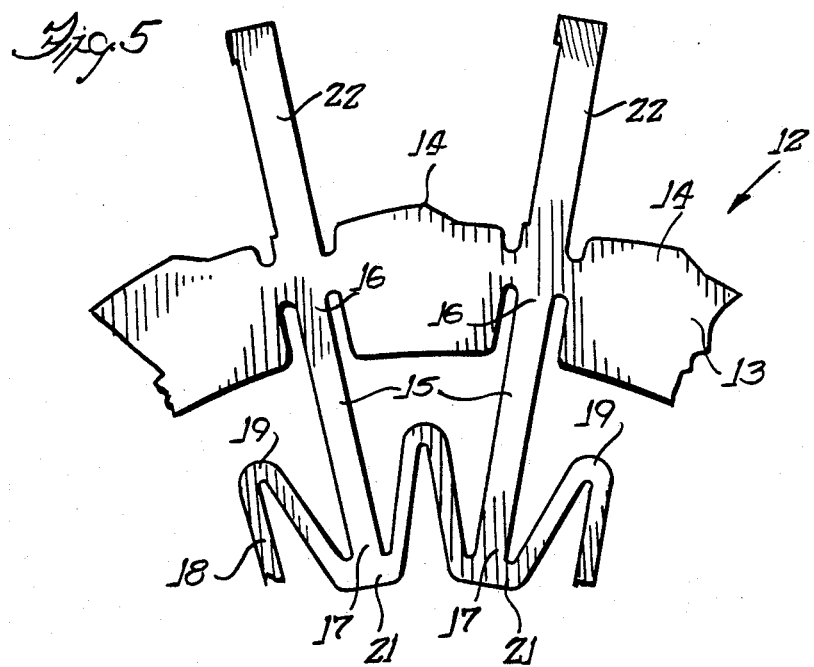

STAMPED ROLLER CLUTCH CAGE WITH INTEGRAL SNAP RING

BACKGROUND OF THE INVENTION

The present invention relates to overrunning clutches and more specifically to a roller clutch cage. In conventional overrunning clutches, a pair of concentrically arranged inner and outer races define an annular space therebetween housing a cage with openings to receive suitable rollers or sprags which are spring-loaded to a position prepared for engagement. Either a metal ribbon energizing spring is utilized for sprags or accordion or folding springs are used for clutch rollers with one end of each spring engaging the adjacent roller and the opposite spring end adapted to hook over a crossbar in the cage and retain the spring in operative position.

Either the outer race or the inner race surface is provided with a series of circumferentially arranged camming surfaces or recesses that cooperate with the clutch rollers to provide a wedging action in one direction of rotation. Often, the cage includes radial projections extending into the recesses to provide rotational stability of the clutch cage relative to the races. However, the cage is still free to shift axially between the races unless means are provided to retain the cage in operative position and prevent axial movement thereof. To positively position the cage, one or more retaining rings, snap rings, or spacing rings are generally used, received in grooves in the races to prevent unwanted axial cage movement. The present invention overcomes this problem in a simple one-piece cage.

SUMMARY OF THE INVENTION

The present invention relates to a novel one-piece roller cage design including integral means to prevent undesirable and/or unwanted axial movement of the cage relative to and between the inner and outer races. The cage includes an annular side plate which may have projections received in camming ramps or recesses in an inner or outer clutch race, a generally annular side ring having a wavy form and axially extending crossbars integral with and extending between the side plate and side ring to define openings receiving clutch rollers and actuating springs therefor. The side ring has a wavy form with circumferentially spaced crests that extend radially higher than the remainder of the cage, which crests are received in an annular groove in the outer race to hold the cage in position. In the alternative, the wavy form has valleys which could extend inwardly to snap into a groove formed in the inner race.

Further objects are to provide a construction of maximum simplicity, efficiency, economy and ease of manufacture and assembly, and such further objects, advantages and capabilities as will later more fully appear and are inherently possessed thereby.

DESCRIPTION OF THE DRAWINGS

FIG. 3 is a partial cross sectional exploded view of the clutch races and cage before assembly.

FIG. 4 is a cross sectional view taken on the line 4—4 of FIG. 2 showing the cage assembled.

FIG. 5 is a partial elevational view of the metal stamping which forms the one-piece clutch cage.

DESCRIPTION OF THE INVENTION

Figure 1:
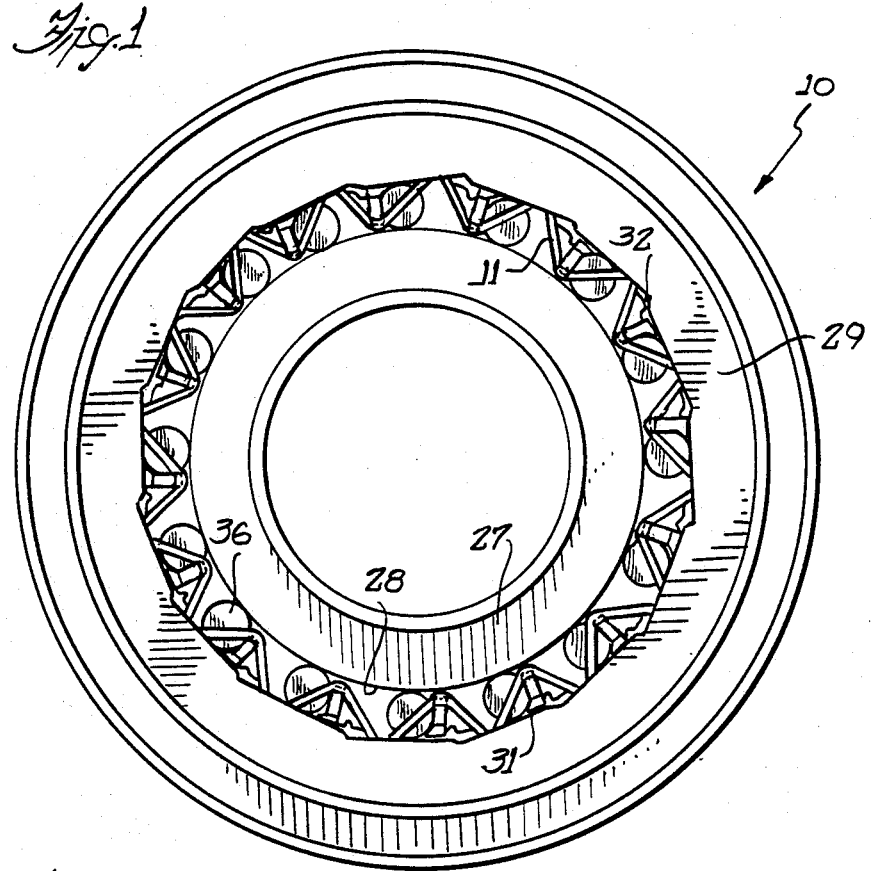
FIG. 1 is a side elevational view of a roller clutch assembly embodying the present invention.
Figure 2:
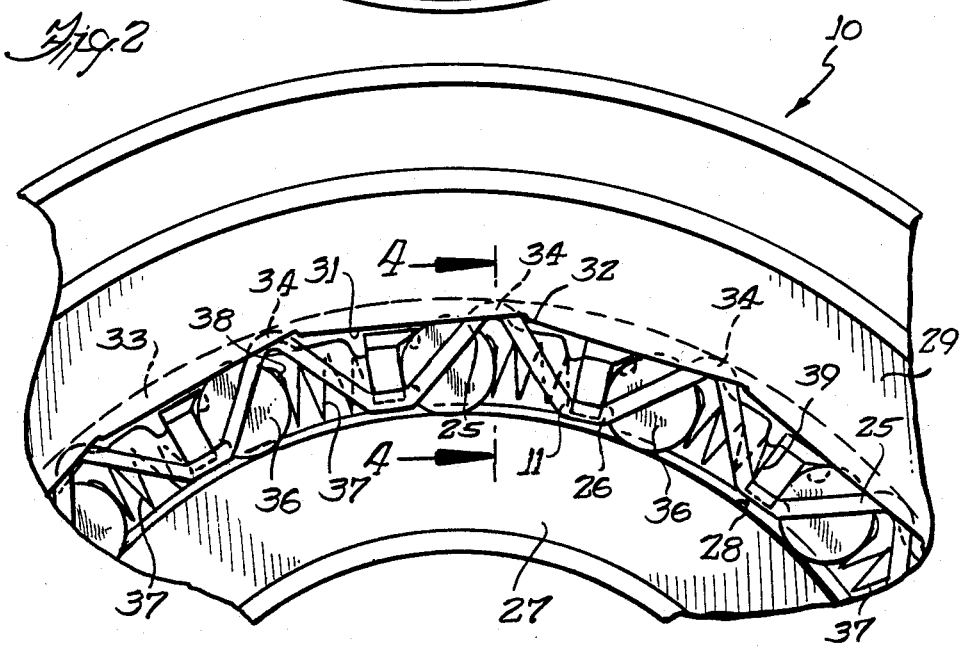
FIG. 2 is a partial enlarged side elevational view of the assembly of FIG. 1.

Referring more particularly to the disclosure in the drawings wherein is shown an illustrative embodiment of the present invention, FIGS. 1 and 2 disclose a roller clutch assembly 10 having a one-piece, seamless clutch cage 11 formed from a one-piece stamping 12 shown in FIG. 5. Considering the stamping, it consists of an annular side plate 13 with crossbars 15 and a side disc 18; the side plate having a plurality of projections 14, the shape of which correspond to the inclined ramps or cams 32 of the outer clutch race 29 and which can be introduced into these ramps 32. The number of projections 14 may correspond to the number of ramps or the projections may be circumferentially spaced to be received in alternate or otherwise spaced circumferentially as desired.

The crossbars 15 are integral with the side plate at their ends 16 and their opposite ends 17 are integral with the side ring or disc 18. The disc 18 has a wavy form having relatively sharp or rounded crests 19 and valleys 21. Also as seen in FIG. 5, additional secondary crossbars 22 may be formed integral with and positioned at the top part of the side plate 13 to provide additional support for the clutch rollers. An illustrative method of shaping the stamped member 12 to form the cage 11 involves bending the side plate 13 upwardly about the ends 16 of crossbars 15 and bending the side disc 18 downwardly about the ends 17 of the cross bars. Both the side plate 13 and side disc 18 remain substantially flat. However, the wavy form of the side disc is substantially expanded to spread out the wavy form as seen in FIGS. 1 and 2 to have smoother rounded crests 25 and flattened valleys 26; the valleys 26 lying closely adjacent the surface 28 of the inner race 27 of the roller clutch assembly 10. The crossbars 15 extend parallel to each other and to the axis of the cage 11 and, if utilized, the secondary crossbars 22 are bent such that they lie parallel to and extend in the same direction as crossbars 15. The sequence of operations forming the cage may vary or other forming methods may be utilized.

The clutch assembly 10 includes an inner race 27 having the cylindrical surface 28 and an outer race 29 having an inner surface 31 with a plurality of circumferentially spaced inclined ramps or cams 32 adapted to receive the projections 14 on the side plate 13. Also formed in the inner surface 31 is an annular groove 33 cooperating with the cage disc peaks or crests 25. As seen in FIGS. 3 and 4, the crests 25 form tabs 34 on the side disc 18 that extend radially outwardly beyond the outer edge 35 of the side plate 13. In view of the inherent flexibility of the cage 11, the cage will slightly deform when inserted between the inner and outer races 27 and 29, respectively, to allow the tabs 34 to contract and then snap into the groove 33 in the outer race to retain the cage axially in position without the necessity of extra retaining rings.

A clutch roller 36 is received in an opening between crossbars 15 to move in the inclined ramp or cam 32 in a wedging action, and a folding or accordion spring has one end 38 terminating in a concave surface engaging a roller 36 and the opposite end 39 is formed with a hook portion to be bent around a crossbar 15 to retain the spring in operative position. Thus, the spring 37 acts to resiliently bias the roller 36 into wedging engagement with the inner and outer races when the outer race rotates clockwise as seen in FIG. 2. When the outer race rotates counterclockwise, the clutch will overrun and the rollers ride up on the ramps 32. When assembled, the cage will be positively retained to prevent undesirable axial movement relative to the races. In the alternative, if the clutch were internally cammed on the inner race, then the valleys 26 of the side disc or tabs added thereto, would project radially inwardly to extend into a groove formed in the surface 28 of the inner race 27. The axial holding force in either arrangement can be increased or decreased by increasing or decreasing the number of tabs allowed to overhang the outer diameter or underhang the inner diameter of the cage.

I claim:

1. In an overrunning clutch having inner and outer concentric races receiving a cage housing rollers and folding springs therefor, wherein said cage includes an annular side plate and a spaced parallel side disc joined by a plurality of crossbars extending parallel to the cage axis, the side disc having a wavy form with crests and valleys adjacent the outer race and the inner race, respectively, the improvement comprising one of said races having an annular groove, and means on said cage cooperating with said groove to retain the cage axially between said races.

2. A cage for an overrunning clutch as set forth in claim 1, wherein said retaining means comprises a plurality of tabs on said cage extending radially into the groove of one of the races.

3. A cage for an overrunning clutch as set forth in claim 2, wherein said groove is formed in the outer race and said tabs are formed by the crests of the wavy form of said side disc.

4. A cage for an overrunning clutch as set forth in claim 3, wherein the flexibility of said cage allows for partial deformation so that the tabs can snap into the groove.

5. A cage for an overrunning clutch as set forth in claim 3, wherein the crests of the wavy form side disc extend farther outward radially than the periphery of said side plate.

6. A cage for an overrunning clutch as set forth in claim 1, wherein a plurality of secondary crossbars extend from said side plate parallel to said first-mentioned crossbars.

7. A cage for an overrunning clutch as set forth in claim 1, wherein said cage is a one-piece, seamless metallic member.

* * * * *